United States Patent [19]

Nakatsukasa et al.

[11] Patent Number: 4,966,194
[45] Date of Patent: Oct. 30, 1990

[54] FOUR-WAY SWITCHING VALVE DEVICE

[75] Inventors: Keiichiroh Nakatsukasa; Takao Matsumoto, both of Tochigi, Japan

[73] Assignee: Ranco Japan Ltd., Tokyo, Japan

[21] Appl. No.: 494,922

[22] Filed: Mar. 13, 1990

Related U.S. Application Data

[63] Continuation of Ser. No. 329,651, Mar. 28, 1989, abandoned.

[30] Foreign Application Priority Data

Jul. 13, 1988 [JP] Japan ................................. 63-172595
Jul. 18, 1988 [JP] Japan ................................. 63-176970

[51] Int. Cl.[5] .............................................. F16K 11/06
[52] U.S. Cl. ................................... 137/625.43; 251/11
[58] Field of Search ........... 137/625.43, 625.6, 625.66, 137/625.64; 251/11

[56] References Cited

U.S. PATENT DOCUMENTS 2,974,682  3/1961  Trask ..................... 137/625.43 X
3,400,736  9/1968  Bastle .................... 137/625.43 X
4,114,645  9/1978  Pauliukonis .................. 251/11 X
4,245,671  1/1981  Kosugui ..................... 137/625.6 X
4,290,453  9/1981  Bauer ......................... 137/625.43
4,293,002 10/1981  Moriyama ................... 137/625.6 X
4,753,271  6/1988  Fornasari et al. .

Primary Examiner—Alan Cohan
Attorney, Agent, or Firm—Michael N. Meller

[57] ABSTRACT

A four-way switching valve device which comprises a valve chamber provided with at least a liquid inflow port and a liquid flow-direction switching means comprising a plurality of liquid inflow and outflow ports and a first valve slidably mounted on the liquid flow-direction switching means to selectively communicate one of the liquid inflow and outflow ports to a liquid outflow port respectively. A second valve is fixedly mounted on at least one end of a connecting rod extending longitudinally inside the valve chamber from the first valve and sliding hermetically inside of the valve chamber, and a thermosensitive slow acting operation device is provided at at least one end of the valve chamber and opposite to the second valve, and further, a switching device for controlling at least the inflow of the high pressure liquid into a cavity formed between the second valve and the slow acting operation device in the valve chamber is provided, the switching device being actuated directly or indirectly by a working rod of the slow acting operation device to thereby cause the high pressure liquid to flow into the cavity to move the first valve, whereby one of the plurality of liquid inflow and outflow ports in the liquid flow-direction switching means is selected to switch the communication to the liquid outflow port. The four way switching valve device of this invention has not only a simple construction but also a small size, providing a greater handling ease and reduced production costs, and therefore, can be widely used in many industrial fields. Further, the operating environment can be improved because the noise of the impulse sound generated during operation is substantially eliminated.

15 Claims, 5 Drawing Sheets

FOUR-WAY SWITCHING VALVE DEVICE

The application is a continuation of application Ser. No. 329,651 filed 3/28/89.

BACKGROUND OF THE INVENTION

1. Field of the Invention

This invention relates to a four-way switching valve device having an improved switching mechanism in an air conditioner used both as a room cooling device and a room heating device for maintaining the cooling or heating conditions in a room by switching to the required condition, and further, this invention relates to a switching valve device emitting a small impulsive sound whenever the valve is operated.

2. Description of the Related Art

A known valve device is shown in FIG. 8, in which the valve device is actuated by an electromagnet as a drive source. The electromagnet comprises a electromagnetic coil 140 for generating a magnetic field, a movable body 141, i.e., a plunger, and a spring 143 returning the plunger 141 to the initial position thereof when the magnetic field is extinguished.

Hereafter, an example of the operation of the electromagnetic valve device having the construction mentioned above, when applied to a pilot switching valve P of a four-way switching valve device, will be explained with reference to FIG. 8.

In FIG. 8, the valve device is integrally composed of an electromagnetic switching valve device and a four-way switching valve device as mentioned above, and in an initial stage thereof, a plunger 141 is positioned at the leftmost side to couple a port 133, which acts as a liquid inflow and outflow port, with a low-pressure liquid source 134 which is a liquid outflow port, by the valve 131, and a port 135, which is another liquid inflow and outflow port, is opened and coupled directly with a liquid inflow port 132, which is connected to a high-pressure liquid source 132' in the pilot valve portion P.

Therefore, in a four-way switching valve device portion 151, a right side valve cavity 152 is under a high pressure, causing the valve 154 to be moved to the leftmost position, together with the separating walls 155 and 156, respectively, to couple a port of a liquid inflow and outflow tube 158 with a port of a liquid outflow tube 159.

A high-pressure liquid is introduced into the four-way switching valve device through a port connected to a liquid inflow tube 161.

At the next stage, when an electric power is applied to the coil 140, the plunger 141 is moved in the direction shown by arrow A, against the resilient force of a spring 143, whereby the valve 131 opens the port 133 for communication with the port 132 connected to the high-pressure liquid source 132', and the port 135 is communicated with the port 134 connected to the low-pressure liquid source 134' connected to the liquid outflow tube 159 provided in this four-way switching valve device.

Then, the high-pressure liquid contained in the right side valve cavity 152 of the four-way switching valve device 151 flows through the tubes 135' and 134' to produce a low pressure in the cavity 152 while introducing the high-pressure liquid into the valve cavity 153 through the port 131 and the port 132 to produce a high pressure in the cavity 153 whereby the valve 154 is moved to the rightmost position together with the separating walls 155 and 156, and thus communication is established between the tube 160 and the tube 159.

Note, the tube 159 is always in a low pressure state.

In this conventional device, at least a force which is a sum of a force for compressing the spring 143 and a force for transferring the valve 131 must be applied to the plunger 141, and therefore, when the plunger 141 is actuated and impinges on an end cap 138 of the pilot valve P, a loud impulse sound is generated due to the high speed at which the plunger 141 impinges on the end cap 138.

Further, due to this high speed impact both the plunger 141 and the end cap 138 suffer extreme mechanical damage serious enough to require frequent replacement thereof, and therefore, a problem arises in that the operation efficiency is lowered and the maintenance cost is increased. Moreover, the conventional valve device has a low operational force since an electromagnet is used to supply the main force, and thus the above-described pilot method must be used when the valve device is applied to a mechanism requiring a relatively large operational force, and this makes the mechanism of the device, as a whole, complicated.

Accordingly, to overcome the above problems, a large size valve device must be utilized to provide a long stroke and large operational force, and further when this kind of valve device is used, electric power must be always supplied to the electromagnetic valve thereof during operation, which is disadvantageous from the economical point of view.

Furthermore, in such a conventional valve device, other problems arise such as a limitation on the kind of materials used, because an electromagnet is utilized and an impulse sound is generated when the electric power applied thereto is an alternating current.

SUMMARY OF THE INVENTION

The object of the invention is to eliminate the disadvantages of the conventional valve device and to provide a four-way switching valve device having a valve which is moved at a slow speed during the operation thereof, to thereby reduce the impulse sound, improve the mechanical functions, and prolong the operating life thereof, and further to reduce the maintenance costs by improving the operating efficiency and environment thereof.

Therefore, in accordance with the present invention, there is provided a four-way switching valve device which comprises, a valve chamber provided with at least a liquid inflow port on a side wall thereof and a liquid flow-direction switching means comprising a liquid outflow port, a plurality of the liquid inflow and outflow ports arranged in the vicinity of the liquid flow-direction switching means, and a first valve slidably mounted on the liquid flow-direction switching means to selectively couple one of the liquid inflow and outflow ports to the liquid outflow port respectively, the liquid flow-direction switching means being provided inside of and on a side wall of the valve chamber and at a distance from the location of the liquid inflow port. The valve device is further characterized by a piston portion fixedly mounted on at least one end of a connecting rod extending longitudinally in the valve chamber from the first valve and sliding hermetically inside the valve chamber, and a thermosensitive slow-acting operation device provided at at least one end of the valve chamber and opposite to the piston. Further, a switching device is provided for controlling at least the inflow of a high-pressure liquid into a cavity formed between the piston on and the slow acting operation device in the valve chamber, the switching device being actuated directly or indirectly by a working rod of the slow-acting operation device to thereby feed the high-pressure liquid into the cavity and thus cause the first valve to move in such a manner that one of the plurality of liquid inflow and outflow ports in the liquid flow-direction switching means is selected to cause the flow to be switched to the liquid outflow port.

Namely, according to the present invention, the four-way switching valve device has a simple construction and superior characteristics, by which the drawbacks of the conventional valve device are eliminated, by efficiently utilizing a combination of a slow-acting operation device and a high-pressure liquid supplied thereto.

DESCRIPTION OF THE PREFERRED EMBODIMENTS

Figure 1:
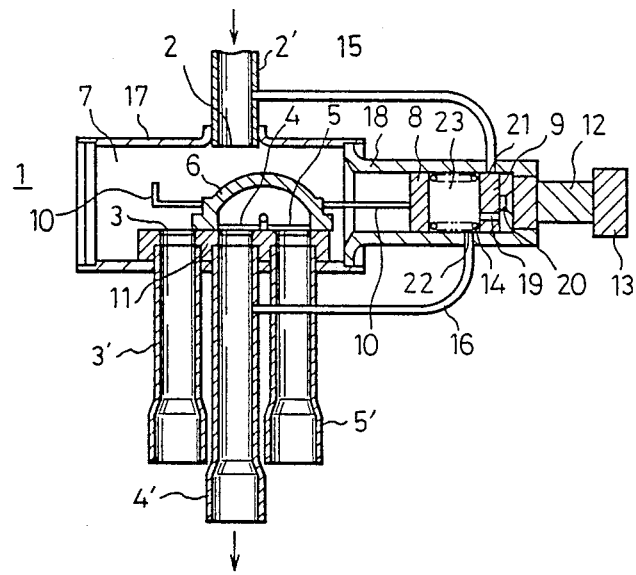
FIGS. 1 to 3 are enlarged cross-sectional views illustrating the operation of a first embodiment of the four-way switching valve device of this invention.

The four-way switching valve device of this invention will be explained in detail by way of preferred embodiments thereof.

In the basic technical concept of this invention, the four-way switching valve device is initially provided with at least a valve chamber formed therein, a hermetical sealing means having a liquid inflow port provided on a wall of the valve chamber, through which a high-pressure liquid is introduced thereinto and a liquid flow-direction switching means comprising a liquid outflow port, a plurality of liquid inflow and outflow ports for allowing a flow of the high-pressure liquid to a load, for example, a heat exchanger of an air conditioner, in one direction therethrough or for returning the liquid from the load in an opposite direction therethrough, respectively, arranged in the vicinity of the liquid outflow port, and a first valve slidably mounted on the liquid flow-direction switching means to selectively communicate one of the liquid inflow and outflow ports to the liquid outflow port provided opposite to the liquid inflow port portion.

In this invention, a piston is fixedly mounted on one end or both ends of a connecting rod extending longitudinally in the valve chamber from the first valve, for sliding the first valve while hermetically sealed in the valve chamber, and further, a thermosensitive slow-acting operation device including, for example, a wax type thermometer, is provided at one end or both ends of the valve chamber and opposite to the piston, whereby a differential pressure chamber is formed between the piston and the slow-acting operation device at one end or both ends of the valve chamber.

A switching means for introducing the high-pressure liquid in the valve is provided in the differential pressure chamber, and comprises a sliding means operated by a working rod of the slow acting operation device, wherein the sliding means can be moved to two different positions to thereby open one high-pressure liquid inflow port separately provided at the differential pressure chamber and close a liquid outflow port also provided thereat or vice versa, to allow an inflow or outflow of the high-pressure liquid into or out of the differential pressure chamber. Alternatively, a second valve provided with a subvalve and a switching means by which the high-pressure liquid inside the valve chamber is introduced into the differential pressure chamber through the subvalve mounted on the second valve, which subvalve is opened by working rod of the slow-acting operation device, may be used.

In the four-way switching valve device of this invention, the first valve can continue to slide until it reaches a position at which the switching operation of the liquid flow-direction switching means is completed, even when the operation of the slow-acting operation device is stopped, under the pressure of the liquid or the force of a resilient means such as a spring or the like.

The embodiments of this invention will be explained hereunder.

First Embodiment

In the first embodiment of the four-way switching valve device of this invention having the basic construction described above, a further technical feature is incorporated in that the switching device of the valve chamber comprises a first sliding means brought into contact with the piston through a resilient coupling means at one side thereof, and into contact with the working rod of the slow-acting operation device at another side thereof. The valve chamber is provided with an opening connected to a by-pass line for the high-pressure liquid, separately from a main source of the high-pressure liquid, provided in the valve, and another opening connected to a by-pass line for the low-pressure liquid connected to a low pressure source, provided on a side wall of the valve chamber corresponding to the cavity formed between the piston and the slow-acting operation device, whereby the sliding means closes or opens these two openings respectively.

A cross-sectional view of this embodiment of the four-way switching valve device of this invention is shown in FIG. 1, in which a liquid inflow port 2 is connected to a liquid tube 2' and a high-pressure liquid is introduced into the valve chamber 7 therethrough, and a plurality of liquid inflow and outflow ports (in this embodiment, a liquid outflow port 4 and two liquid inflow and outflow ports 3 and 5) are provided by which the direction of the flow of the liquid, used for a load in, for example, an air conditioner or the like, is switched.

Further, a first valve 6 is provided inside the valve chamber 7 of the body of the valve device 17, the first valve 6 being able to selectively close or open the plurality of liquid inflow and outflow ports to allow a flow of the high-pressure liquid introduced therein, respectively.

In this embodiment, a sheet 11 may be provided on the first valve 6 to enable a more efficient selective opening or closing operation thereof.

Further, in this embodiment, the first valve 6 must have a size sufficient to cover at least one of the liquid inflow and outflow ports 3 and 5 and a liquid outflow port 4 when slid to either the right or left, and further, has a construction such that the liquid inflow and outflow ports 3 and 5 and the liquid outflow port 4 covered with the first valve 6 can be coupled with each other inside the first valve 6.

Alternatively, a valve drive 18, which is a part of the body of the valve 17, is provided with a piston 8 hermetically connected with the inner surface of the valve drive 18 and able to slide therein, and further, can slide together with the first valve 6, through a connecting rod 10 provided therebetween.

Further, the piston 8 serves as a separating wall forming a differential pressure chamber 23 explained later.

A slow-acting operation device 12 having a working rod, which is extended or contracted in accordance with a temperature detected, is provided at one end of the valve drive 18, i.e., at the end of the valve opposite to the piston 8, and a heat generating body, preferably a heat generating body generating a constant temperature 13 for heating the slow-acting operation device to thereby cause an operation of same, is attached to the slow-acting operation device.

Alternatively, a first sliding means 9 is provided in a differential pressure chamber 23 formed between the slow-acting operation device 12 and the piston 8, and having one side surface thereof in contact with a working rod 20 of the slow-acting operation device 12 and the other side surface thereof in indirect contact with the piston 8 through a spring 14. Further, an aperture 19 through which the high-pressure liquid can be passed is provided in the first sliding means 9.

A port portion 21 connected to a by-pass line 15 for the high-pressure liquid, separately from the source of the high-pressure liquid 2, and a port portion 22 connected to a by-pass line 16 for the low-pressure liquid connected to a low-pressure liquid source 4, are provided on the wall portion of the valve drive 18 and the first sliding means 9 is able to move to two positions in which it can open or close the ports 21 or 22, respectively.

Note that the first sliding means 9 in this embodiment constitutes the switching device of this invention.

Preferably a thermosensitive slow-acting operation device reacting slowly to variations of the temperature, for example a wax type thermoelement known as a "wax thermo" or a shape memorized alloy or the like, can be generally used as the slow-acting operation device in this invention.

The kind of heating body having a constant temperature used in this invention is not restricted, and any heating body which can output a predetermined constant temperature through a suitable heating means, such as a means for applying an electric current thereto or the like, can be used in this invention.

Assuming that the electric power is not yet supplied to the constant heating body 13, the wax thermo in the slow-acting operation device 12 is contracted, and therefore as shown in FIG. 1, the port 21 connected to the by-pass line for high-pressure liquid 15 is closed by the first sliding means 9 while the port portion 22 connected to the by-pass line for low-pressure liquid 16 is open.

Accordingly, a differential pressure between the valve chamber 7 and the differential pressure chamber 23, formed on opposite sides of the piston 8 respectively, is created, i.e., the pressure of the liquid inside the valve chamber 7 is high and the pressure of the liquid inside the differential pressure chamber 23 is low. Therefore, the first valve 6, the connecting rod 10, and the piston 8 are moved to the right most position against the spring force 14, and kept at that position. Accordingly, the high pressure liquid inflow port 2 is coupled to the liquid inflow and outflow port 3 while the liquid outflow port 4 is connected with the liquid inflow and outflow port 5.

Note that, in this invention, the liquid outflow port 4 is always connected to the low-pressured source.

Therefore, for example, in the valve device of this invention, when the liquid inflowing from the liquid inflow port 2 is introduced into the valve chamber, it is output from the liquid inflow and outflow port 3 into a system of a control unit such as an air conditioner or the like, and thereafter, the liquid is returned to the valve chamber through the liquid inflow and outflow port 5 and is directly output through the first valve 6 and the liquid outflow port 4 connected to the low-pressure liquid source.

Next, when electric power is supplied to the constant heating body 13 to increase the temperature thereof, the slow-acting operation device 12 composed of, for example, a wax type thermometer is heated and the working rod 20 is gradually extended to the left to push the first sliding means 9 to the left, whereby the port 21 connected to the by-pass line 15 for high-pressure liquid is opened and the port 22 connected to the by-pass line for low-pressure liquid 16 is closed.

Figure 2:
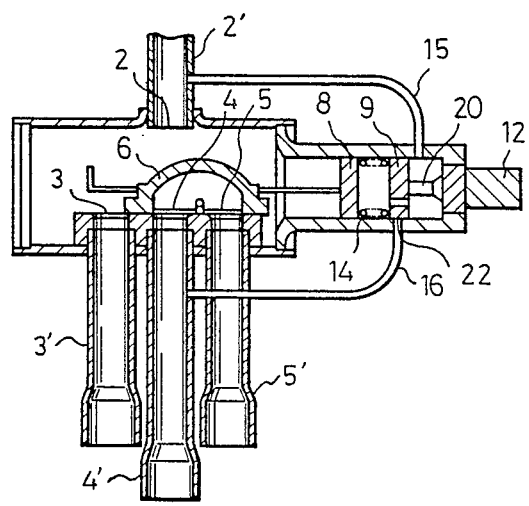

Thereafter, the high-pressure liquid is introduced into the valve cavity 23 from the by-pass line 15, through an aperture 19 of the first sliding means 9, to raise the pressure in the cavity 23 to eliminate the differential pressure between the cavity 23 and the valve chamber 7 disposed on the opposite side of the piston 8. Therefore, both the piston 8 and the first valve 6 are moved to the left by the force of the spring 14, even if the pushing force of the working rod 20 of the slow-acting operation device 12 on the sliding means 9 is no longer exerted due to a stopping of the electric power supply to the constant heating body 13, since there is now no pressure difference between both sides of the piston 8. (refer to FIG. 2)

Figure 3:
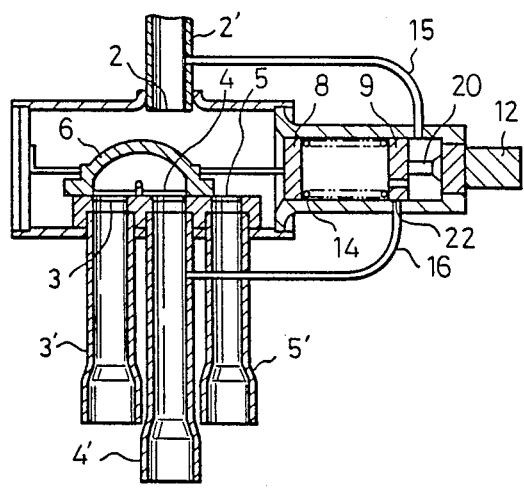

Finally, when the first valve 6 reaches the position shown in FIG. 3, the valve device of this invention is switched so that the liquid inflow and outflow port 3 and the liquid outflow port 4 are coupled while the liquid inflow port 2 and the liquid inflow and outflow port 5 are communicated to form a separate liquid flow in which the liquid flows in this line in the opposite direction to that shown in FIG. 1.

Thereafter, when the electric power supply to the constant heating body 13 is stopped, the sliding means 9 is moved back to the right to close the port 21 connected to the by-pass line for high-pressure liquid 15 and open the port 22 connected to the by-pass line for low-pressure liquid 16.

In this situation, the high-pressure liquid in the valve cavity 23 flows from the port 22 connected to the by-pass line 16 to again produce a differential in the pressure at both sides of the piston 8.

The sheet 11 of this invention may be provided on the first valve separately therefrom.

Further, in this invention, a stopper 26 may be provided to prevent an excessive movement of the first sliding means 9 and to clearly define the stopping position thereof in the valve chamber or valve cavity.

Figure 4:
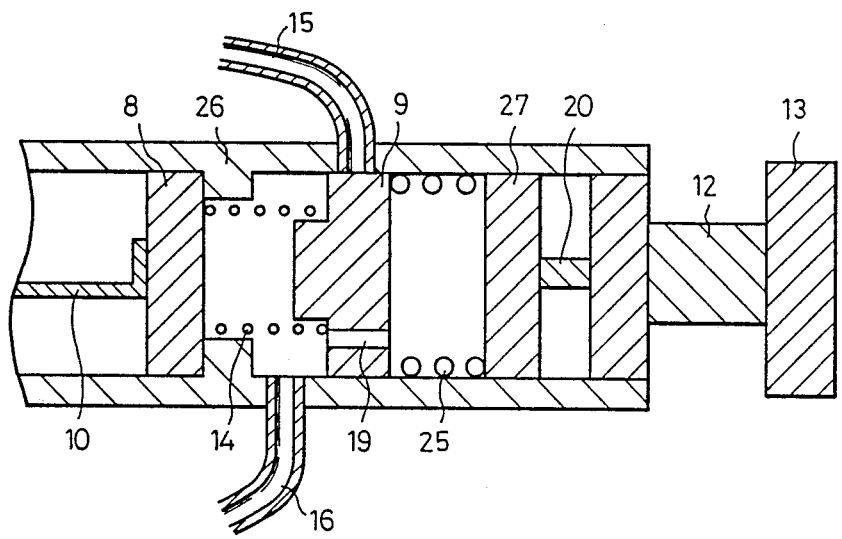
FIG. 4 is an enlarged cross-sectional view of a second embodiment of the four-way switching valve device of this invention.

In this invention, as shown in FIG. 4, another sliding means 27 may be provided between the working rod 20 of the slow-acting operation device 12 and the first sliding means 9, instead of connecting the working rod 20 of the slow-acting operation device 12 directly to the side surface of the first sliding means 9, whereby one surface of the second sliding means 27 is connected to the working rod 20 of the slow-acting operation device 12 and another surface thereof is in contact with the first sliding means 9 indirectly through a spring 25, and thus, when excessive movement of the working rod 20 of the slow-acting operation device 12 occurs the extra force can be absorbed thereby.

Note, the strength of the spring 25 is preferably greater than that of the spring 14.

Second Embodiment

In this second embodiment of the four-way switching valve device having the basic construction described above, the device has a specific construction such that piston portions are provided at both ends of the connecting rod extending longitudinally in the valve chamber from the first valve portion to slide hermetically inside the valve chamber integrally with the first valve portion and to form a hermetically seal with the valve chamber, and slow-acting operation devices are provided at both ends of the valve chamber and opposite to the piston portion to form a differential pressure chamber between the piston portion and the slow-acting operation devices, the valve device being further characterized in that a subvalve is provided as the switching device, and the subvalve is opened by the working rod of the slow-acting operation device in contact therewith.

Figure 5:
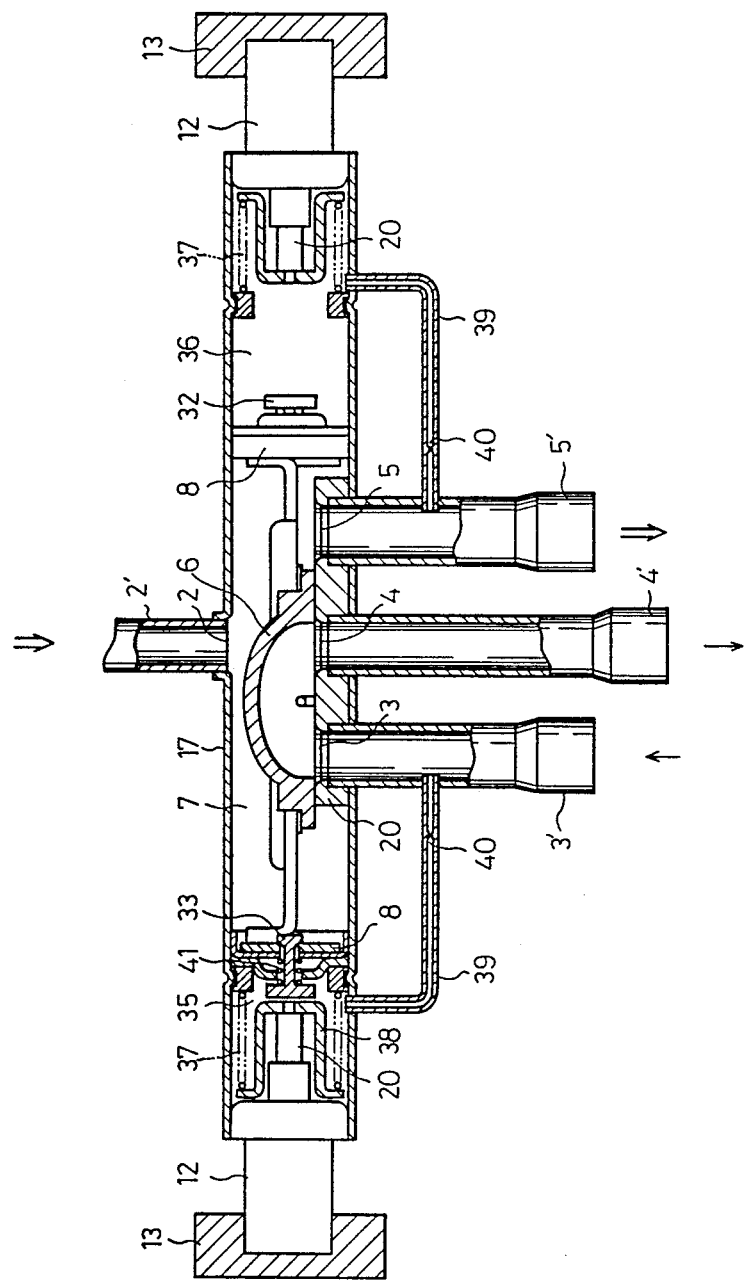
FIG. 5 is an enlarged cross-sectional view of a third embodiment of the four-way switching valve device of this invention.

In FIG. 5, the four-way switching valve device is provided with a liquid inflow port portion 2 and a plurality of liquid inflow and outflow ports having the same function as in the first embodiment, i.e., two liquid inflow and outflow ports 3 and 5 and a liquid outflow port 4 are provided.

In this example, a first valve 6 and two piston 8 and 8', each of which serve as a separating plate and are slidable hermetically inside the valve chamber 7 of piston valve device 17, hereinafter referred to as the portions, are provided to form a valve chamber 7 between these pistons portions and the first valve.

Further, in this invention, differential pressure chambers 35 and 36 are formed between the portion 8 or 8' respectively and each end of the valve device 17.

Furthermore, in this second embodiment, a liquid inflow port 2 is connected to a liquid tube 2' and a high-pressure liquid is introduced into the valve chamber 7 therethrough, and a plurality of the liquid inflow and outflow ports, i.e., a liquid outflow port 4 and two liquid inflow and outflow ports 3 and 5, are provided and function to switch the direction of flow of the liquid used for a load in a control unit such as an air conditioner or the like.

In this embodiment, a liquid inflow port 2 of a liquid inflow tube 2' and a plurality of liquid inflow and outflow ports comprising two liquid inflow and outflow ports 3 and 5 of liquid inflow and outflow tubes 3' and 5', respectively, and a liquid outflow port 4 of a liquid outflow tube 5, are provided on the side wall of the valve chamber 7 of the valve device 17, and further, the first valve 6 slidable integrally with the pair of pistons 8 and 8' is provided, to selectively switch communication between the liquid inflow and outflow ports 3 and 5 with the liquid inflow port portion 2 to the liquid outflow port portion 4, and vice versa.

FIG. 5 shows the first valve 6 displaced to the leftmost position to couple the liquid inflow and outflow port 3 with the liquid outflow port 4 and the liquid inflow and outflow port 5 with the liquid inflow port 2.

The remaining construction and functions of this embodiment are the same as those of the valve device of the first embodiment, except that the subvalves 32 and 33, which serve as the switching device of this embodiment, are provided on each of pistons 8 and 8' respectively, and each subvalve is opened by the working rod 20 of the slow-acting operation device 12 attached to the end thereof. When the first valve portion 6 is to be moved to switch the valve device, an external end surface of the slow-acting operation device 12 is provided with a constant heat by a suitable heating means 13, and thus one of the working rods is caused to push against one of the subvalves mounted on one of the first valves, to open the valve.

Namely, when electric power is supplied to the heating means 13 to increase the temperature thereof the slow-acting operation device 12, composed of, for example, a wax type thermometer, is heated and the working rod 20 is gradually extended to the left to push against the subvalve 33 of the piston 8.

In this embodiment, the working rod 20 of the slow-acting operation device 12 may be directly in contact with the subvalves 32 and 33 but preferably the working rod 20 is in contact with the subvalves 32 and 33 through a spring receiver 38 holding a return spring 37.

As is apparent from FIG. 5, the high-pressure liquid inflow through the liquid inflow port 2 is coupled with the liquid outflow port 5 to provide a high-pressure side, while the liquid inflow and outflow port 3 is communicated with the liquid outflow port 4 to provide a low-pressure side.

Accordingly, the differential pressure chamber 35 has a low-pressure because the high-pressure liquid has flowed to the high-pressure source through the pipe 39, and the differential pressure chamber 36 has a high pressure, and accordingly, the first valve 6 is moved to the leftmost position of the valve device and kept in this position by the differential pressure between the differential pressure chambers 36 and 37.

Further, since electric power is not supplied to the heating means 13, the working rod 20 of the slow-acting operation device 12 is contracted to the initial position and is not in contact with the subvalve 33.

Figure 6:
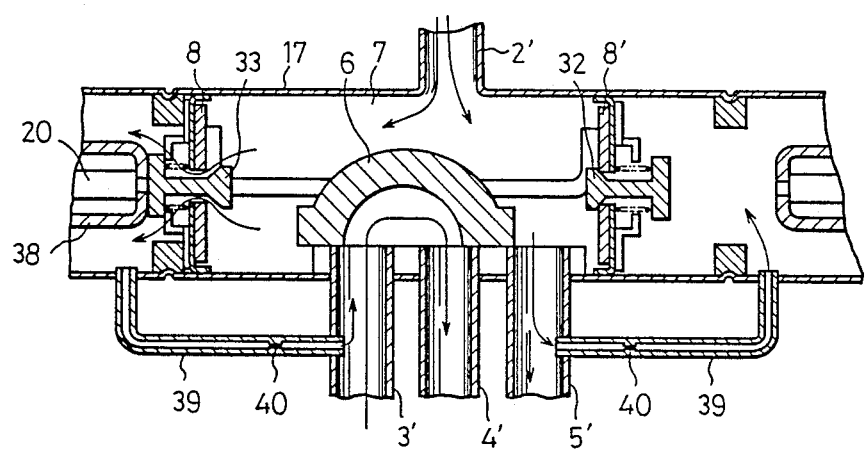
FIGS. 6 and 7 are enlarged cross-sectional views illustrating the operation of the embodiment of the four-way switching valve device shown in FIG. 5; and, FIG. 8 is an enlarged cross-sectional view of a conventional four-way switching valve device.

As shown in FIG. 6, when electric power is supplied to the heating means 13 provided on the left end of the valve device 17, the working rod 20 is slowly displaced to the right due to the action of the slow-acting operation device 12 pushing against and opening the subvalve 33 of the piston 8. Then, the high-pressure liquid inside the valve chamber 7 is allowed to flow into the differential pressure chamber 35.

At the same time, the high-pressure liquid flows into the pipe 39, but this flow is limited by an orifice 40 in the pipe 39, to produce a high-pressure in the differential pressure chamber 35 until it is at the same pressure as that of the differential pressure chamber 36.

Also at that time, when the working rod 20 is further displaced to push the piston 8 to the right and simultaneously, the first valve 6 is also moved to the right, the first valve 6 can be moved by a small force from the slow-acting operation device since no differential pressure exists inside the valve device, and further, as shown in FIG. 1, an auxiliary spring can be provided between the slow-acting operation device 12 and the piston 8, whereby the first valve 6 can be moved regardless of the force from the working rod 20, in the same manner as indicated in FIG. 1.

Figure 7:
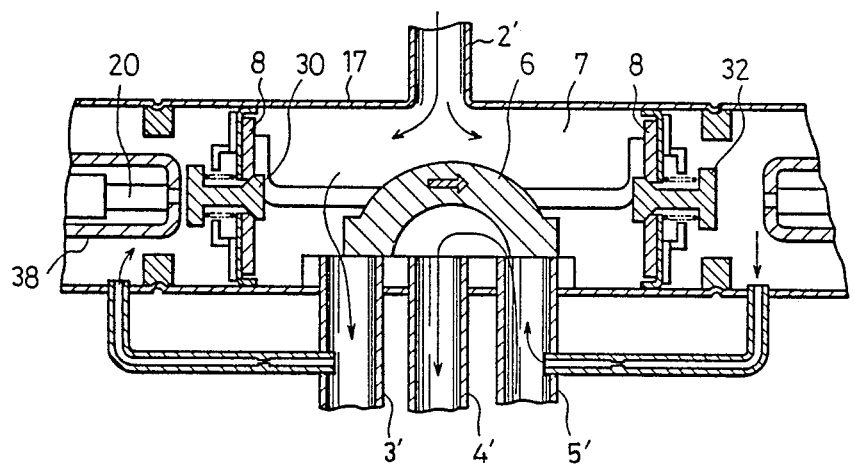
Figure 8:
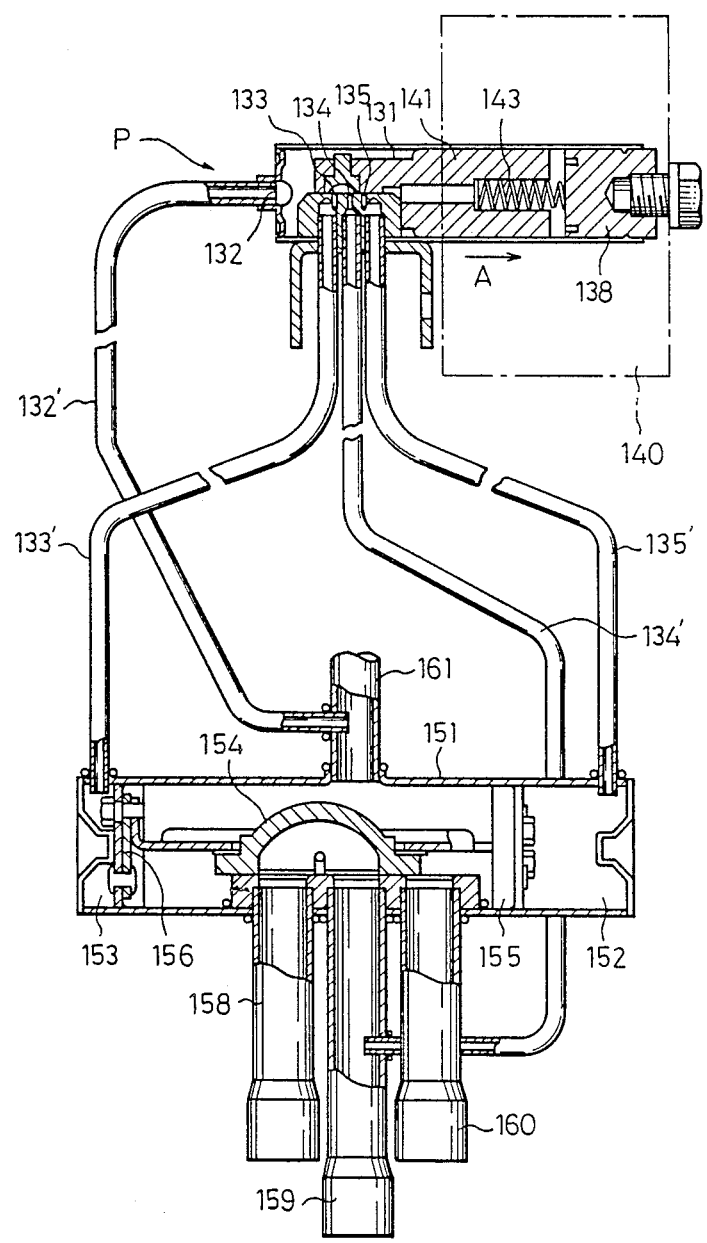

Further, as shown in FIG. 7, when the first valve 6 is moved to the position at which the liquid outflow port 4 and the liquid inflow and outflow port 5 are coupled, the high-pressure liquid contained in the differential pressure chamber 36 flows out through the pipe 39 into the liquid inflow and outflow tube 5' and a differential pressure is created between the valve chamber 7 and the differential pressure chamber 36, and consequently, the first valve 6 can be moved gradually to the right thereafter by the pressure difference, until finally, the first valve 6 is held at the right-most position by this pressure difference.

At this time, the supply of the electric power to the constant heating body 13 can be stopped, and thus the working rod 20 can be pushed back to the initial position by the return spring 37, until the next operation.

Therefore, in this invention, the stroke of the slow-acting operation device 12 required to move the first valve 6 may be short and the power required may be low.

Further, in this invention as mentioned above, a lock mechanism for holding the valve at the necessary position is not required because the first valve is kept in that condition by the pressure difference.

Further, when the first valve 6 is to be moved in the opposite direction, the operation explained above is reversed.

In this invention, the four-way switching valve device as mentioned above can be used as a pilot valve for operating a large size valve, and a bellows, bimetal or the like can be used as the slow-acting operation device of this invention.

Further, in this invention, the subvalves 32 and 33 can be mounted on the pistons 8 and 8' with a suitable spring 41.

The four-way switching valve device of this invention has a simple construction and ease of handling, and therefore, can be widely used in many industrial fields.

Further, in this invention, the valve portion is operated slowly by using a slow-acting operation device, and therefore, impulse sounds and production costs can be reduced, since in this invention, there is no limitation to the materials to be used in this valve because the force for moving the valve is self-generated by the slow-acting operation device, which is completely different from the concept of the present electromagnets.

Furthermore, in this invention, the size of the valve device can be minimized because a sufficient operating force for moving the valve can be obtained without using a large size coil, for example, and the flow rate can be increased due to the large stroke of the valve.

Also, the four-way switching valve device of this invention is economic in use because the electric power required by the constant heating body used in this invention is much less than that required by the coils of an electromagnet.

Namely, in the conventional electromagnet, electric power must be always supplied thereto, causing a constant 6-10 W of the electric power to be consumed, but in this invention, only up to 4 W of electric power is required, and thus this invention is more economical.

Moreover, in the four-way switching valve device of this invention, especially in the second embodiment described above, when the operation for switching the valve portion is required, the electric power can be supplied to only one of the slow-acting operation devices mounted on both ends of the valve device, and after the switching operation is finished, the valve can remain at that position even after the supply of the electric power is stopped, and accordingly, this invention is economical in use and allows a remarkable reduction of production costs.

What is claimed is:

1. A four-way switching valve device which comprises a valve chamber composed of at least a liquid inflow port for allowing only an inflow of liquid into said valve chamber and provided on a side wall of said valve chamber and a plurality of ports including at least a liquid outflow port for allowing only an outflow of liquid from said valve chamber and a plurality of liquid inflow and outflow ports, said plurality of ports being provided on a side wall of said valve chamber at a distance from said liquid inflow port, and a liquid flow-direction switching means provided inside of said valve chamber and arranged in a vicinity of said plurality of ports and comprising at least a first valve member slidably mounted on said plurality of ports to selectively communicate between said liquid outflow port and one of said liquid inflow and outflow ports respectively, said valve device further including a piston portion fixedly mounted on at least one end of a connecting rod extending longitudinally along said valve chamber from said first valve member and sliding hermetically inside of said valve chamber, and a thermo-sensitive slow acting operation device provided on at least one end of said valve chamber and opposite to said piston portion, and further, a switching device for controlling at least an inflow of high pressure liquid into a cavity formed between said piston portion and said slow acting operation device in said valve chamber, said switching device being actuated in response to a movement of a working rod of said slow acting operation device to thereby cause the high pressure liquid to flow into said cavity and cause a movement of said first valve, whereby one of said plurality of liquid inflow and outflow ports in said liquid flow-direction switching means is selected to switch the communication to said liquid outflow port, wherein piston portions are provided at both ends of said connecting rod extending longitudinally inside said valve chamber from said first valve to slide hermetically inside the valve chamber integrally with said first valve and to make a hermetically sealed chamber, and said slow acting operation devices are provided at both ends of said valve chamber and opposite to said piston portions to form a differential pressure chamber between said piston portions and said slow acting operation device, said valve device further including sub valves provided as said switching device, said sub valve being opened by said working rod of said slow acting operation devices.

2. A four-way switching valve devices as in claim 1, wherein means for supplying a high pressure liquid to the cavity formed between said piston portion and said slow acting operation device is provided at least at one end of said valve chamber.

3. A four-way switching valve device as in claim 1, wherein said first valve is constructed so as to continue to slide until said valve reaches the place at which the switching operation of said liquid flow direction switching means is completed, regardless of the operation of said rod of said slow-acting operation device, after said high-pressure liquid is introduced into said cavity formed between said piston and said slow-acting operation device by the operation of said switching device.

4. A four-way switching valve device as in claim 1, wherein said switching device of said valve chamber comprises a first sliding portion in contact with said piston through a resilient coupling means at one side thereof and in contact with said working rod of said slow-acting operation device at another side thereof, and further, said valve chamber is provided with an opening connected to a by-pass line for high-pressure liquid, separately from a main source of said high-pressure liquid provided on a part of said valve device, and another opening connected to a by-pass line for low-pressure liquid connected to a low-pressure source thereof on a side wall of said valve chamber corresponding to the cavity formed between said piston and said slow-acting operation device and said first sliding portion being able to open or close said two openings respectively.

5. A four-way switching valve device as in claim 1, wherein an aperture for transmitting said liquid therethrough is provided in said first sliding portion.

6. A four-way switching valve device as in claim 1, wherein a second sliding portion having one side thereof in contact with said working rod of said slow-acting operation device and another side thereof in contacted with one side of said first sliding portion through an resilient coupling means, is further provided between said first sliding portion and said slow-acting operation device.

7. A four way switching valve device as in claim 6, wherein the strength of said resilient coupling means provided between said first sliding portion and said second sliding portion is stronger than that of said resilient coupling means provided between said piston and said first sliding portion.

8. A four-way switching valve device as in claim 1, wherein said high-pressure liquid supplied inside said valve chamber is introduced into said differential pressure chamber formed between said piston portions and said slow-acting operation devices through said sub-valves.

9. A four-way switching valve device as in claim 8, wherein said differential pressure chamber is connected by a liquid inflow and outflow tube connected to said liquid inflow and outflow ports.

10. A four-way switching valve device as in claim 1, wherein at least one of said slow-acting operation devices is actuated when said first valve is operated.

11. A four-way switching valve device as in claim 1, wherein said slow-acting operation device is a thermosensitive type slow-acting operation device which operates in accordance with detected variations of a temperature.

12. A four-way switching valve device according to claim 11, wherein a heating element generating a constant temperature is provided in contact with said slow-acting operation device.

13. A four-way switching valve device as in claim 8, wherein at least one of said slow acting operation devices is actuated when said first valve is operated.

14. A four-way switching valve device as in claim 9, wherein at least one of said slow acting operation devices is actuated when said first valve is operated.

15. A four-way switching valve device as in claim 13, wherein said slow acting operation device is a thermosensitive type slow acting operation device which operates in accordance with detected variations of a temperature.

* * * * *